United States Patent
Govindarajan et al.

(10) Patent No.: US 7,254,133 B2
(45) Date of Patent: Aug. 7, 2007

(54) PREVENTION OF DENIAL OF SERVICE ATTACKS

(75) Inventors: Priya Govindarajan, Hillsboro, OR (US); David M. Durham, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 1046 days.

(21) Appl. No.: 10/196,541

(22) Filed: Jul. 15, 2002

(65) Prior Publication Data

US 2004/0008681 A1 Jan. 15, 2004

(51) Int. Cl.
*H04L 12/28* (2006.01)
(52) U.S. Cl. .................... 370/394; 709/228
(58) Field of Classification Search ............ None
See application file for complete search history.

(56) References Cited

U.S. PATENT DOCUMENTS

| | | | |
|---|---|---|---|
| 5,884,033 A | 3/1999 | Duvall et al. | |
| 5,991,881 A | 11/1999 | Conklin et al. | |
| 6,598,081 B1 * | 7/2003 | Coile et al. ............... | 709/227 |
| 6,725,378 B1 * | 4/2004 | Schuba et al. ............ | 726/13 |
| 6,772,334 B1 * | 8/2004 | Glawitsch ................. | 713/153 |
| 6,779,033 B1 * | 8/2004 | Watson et al. ............ | 709/227 |
| 6,789,203 B1 | 9/2004 | Belissent | |
| 6,944,663 B2 * | 9/2005 | Schuba et al. ............ | 709/225 |
| 7,058,718 B2 * | 6/2006 | Fontes et al. ............. | 709/228 |
| 2002/0032871 A1 | 3/2002 | Malan et al. | |
| 2004/0008681 A1 | 1/2004 | Govindarajan et al. | |
| 2005/0276228 A1 | 12/2005 | Yavatkar et al. | |
| 2006/0005245 A1 | 1/2006 | Durham et al. | |
| 2006/0095961 A1 | 5/2006 | Govindarajan et al. | |
| 2006/0095970 A1 | 5/2006 | Rajagopal et al. | |

OTHER PUBLICATIONS

Schuba et al, Analysis of a Denial of Service Attack on TCP, IEEE, pp. 208-223, 1997.*
Osman et al, A Stateful Inspection Module Architecture, IEEE, pp. 259-265, 2000.*
Bernstein, SYN cookies, pp. 1-3, 2001.*
Bernstein, e-mail message Re: SYN Flooding [info], p. 1, 2001.*
Matthew M. Williamson, "Throttling Viruses: Restricting Propagation to Defeat Malicious Mobile Code", Information Infrastructure Laboratory, HP Laboratories Bristol, HPL-2002-172, Jun. 17, 2002, 7 pages, Hewlett-Packard Company.

(Continued)

*Primary Examiner*—Frank Duong
(74) *Attorney, Agent, or Firm*—Blakely, Sokoloff, Taylor & Zafman LLP (57) ABSTRACT

Denial of service type attacks are attacks where the nature of a system used to establish communication sessions is exploited to prevent the establishment of sessions. For example, to establish a Transmission Control Protocol (TCP)/Internet Protocol (IP) communication session, a three-way handshake is performed between communication endpoints. When a connection request is received, resources are allocated towards establishing the communication session. Malicious entities can attack the handshake by repeatedly only partially completing the handshake, causing the receiving endpoint to run out of resources for allocating towards establishing sessions, thus preventing legitimate connections. Illustrated embodiments overcome such attacks by delaying allocating resources until after the three-way handshake is successfully completed.

30 Claims, 6 Drawing Sheets

OTHER PUBLICATIONS

Matthew M. Williamson, "Throttling Viruses: Restricting Propagation to Defeat Malicious Mobile Code", Information Infrastructure Laboratory, HP Laboratories Bristol, HPL-2002-172 (R.1), Dec. 10, 2002, ACSAC Conference, Dec. 2002, Las Vegas, NV, 9 pages, Hewlett-Packard Company.

Jamie Twycross et al., "Implementing and Testing a Virus Throttle", Trusted Systems Laboratory, HP Laboratories Bristol, HPL-2003-103, May 21, 2003, Proceedings 12th USENIX Security Symposium, Aug. 4-8, 2003, Washington, DC, 11 pages, Hewlett-Packard Company.

Matthew M. Williamson, "Design, Implementation and Test of an Email Virus Throttle", Information Infrastructure Laboratory, HP Laboratories Bristol, HPL-2003-118, Jun. 30, 2003, 10 pages, Hewlett-Packard Company.

Matthew M. Williamson et al., "Virus Throttling", Virus Bulletin, Mar. 2003, Research Feature 1, p. 8-11, Virus Bulletin Ltd, The Pentagon, Abingdon, Oxfordshire, OX14 3YP, England.

Matthew M. Williamson et al., "Virus Throttling for Instant Messaging", Digital Media Systems Laboratory, HP Laboratories Bristol, HPL-2004-81, May 5, 2004, Virus Bulletin Conference, Sep. 2004, Chicago, IL, 10 pages, Hewlett-Packard Company.

* cited by examiner

PREVENTION OF DENIAL OF SERVICE ATTACKS

FIELD OF THE INVENTION

The invention generally relates to networking, and more particularly to preventing denial of service (DOS) attacks, and distributed DOS attacks, by delaying allocation of connection resources until a connection handshake is completed.

BACKGROUND

Denial of service (DOS) attacks are on the increase. A DOS attack is one where one or more fictitious network clients repeatedly contact a server in an apparent attempt to communicate with the server. Generally, a server allocates server resources to address an incoming connection. Typically, a server maintains a limited buffer for storing information about a connecting client during a handshaking exchange of messages for setting up a communication session with the client. However, during an attack, the handshaking is never completed by the fictitious network clients, and therefore the server's resources are not released, until, perhaps, a handshaking time out occurs. By rapidly sending fictitious connection attempts, the servers' limited buffer for incoming connections can be overwhelmed, thus causing legitimate connection attempts to be rejected.

Figure 1:
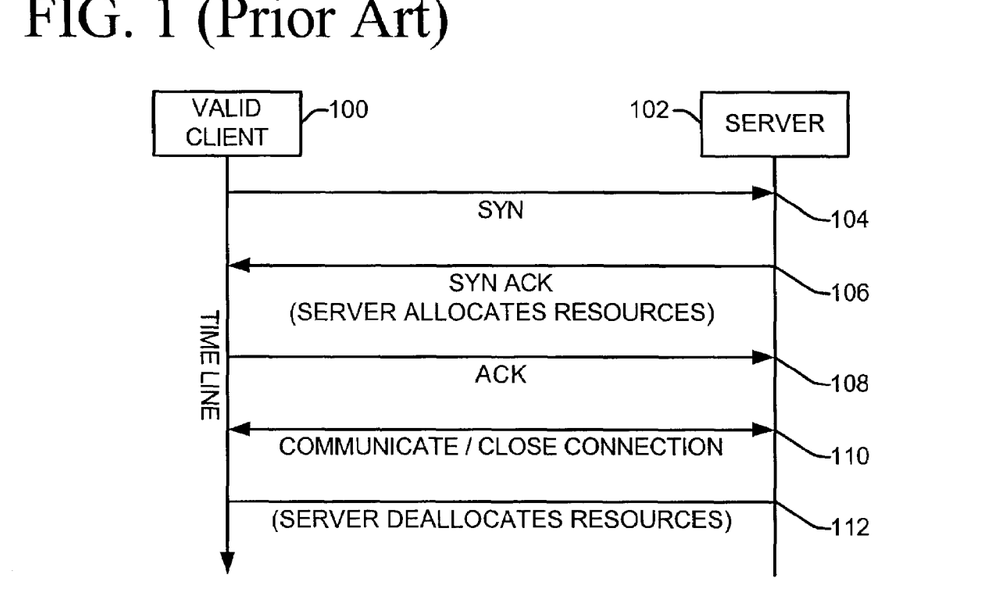
FIG. 1 illustrates establishing conventional TCP/IP communication session.

Such an attack may be made with respect to any communication protocol in which a server allocates resources. However, such attacks are typically seen with respect to the Transmission Control Protocol (TCP)/Internet Protocol (IP), as this is the most common networking protocol in use today. For example, FIG. 1 illustrates establishing conventional TCP/IP communication session. TCP/IP is designed to ensure robust data delivery. Thus, both sides to a communication session are required to keep session state and both transmit and receive acknowledgement packets.

To initiate a TCP/IP communication session, a valid client 100 sends 104 a server 102 a synchronization (SYN) packet to indicate the desire to communicate. The SYN packet also contains the client's Initial Sequence Number (ISN), which the server needs for sequencing fragmented data received from the client. The server allocates resources in its limited buffer for the incoming connection, and then sends 106 the client a synchronization/acknowledgement (SYN/ACK) packet. This SYN/ACK acknowledges the SYN packet sent by the client by setting the ACK number to be the Clients ISN+1, and also includes the server's own ISN (usually a randomly generated number by the server). In response, the client then sends 108 the server an acknowledgement (ACK) packet, which again is typically the server's ISN+1. These three operations are collectively referred to as the TCP/IP three-way handshake, and only when all three operations are completed, is a TCP/IP communication session established between the client and the server.

Figure 2:
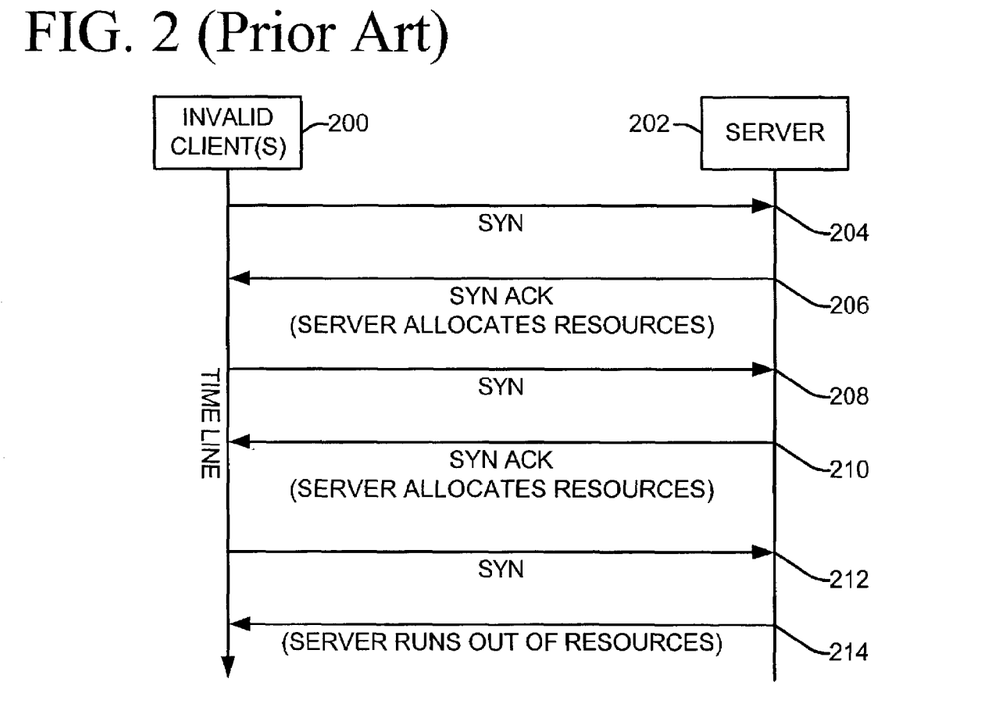
FIG. 2 illustrates a typical DOS attack.

FIG. 2 illustrates a typical DOS attack. An invalid client 200 (or multiple different clients) sends 204 a SYN packet to a server 202. As discussed above, the server then allocates resources for establishing a communication session, and responds 206 with a SYN/ACK packet. Typically the source address for the SYN packet is forged so that the server's SYN/ACK reaches a non-existent client. If the forged address exists, a reset will be sent by that machine in response to the server's SYN/ACK since it had not initiated the connection, resulting in the connection being closed. Consequently, in most attacks, an attacker ensures the forged address either does not exist or is a victim in another attack which is using up its resources so that a real client will not send a TCP Reset message and close the TCP session. The attacker continues to send 208, 212 such TCP messages with forged addresses to the server and at such a rapid rate that the server allocates resources 210 until it runs out of resources 214 for establishing any more communication sessions. Thus, legitimate TCP connection attempts fail, denying service to real users.

BRIEF DESCRIPTION OF THE DRAWINGS

The features and advantages of the present invention will become apparent from the following detailed description of the present invention in which.

DETAILED DESCRIPTION

A significant limitation to the three-way handshake for establishing a TCP/IP communication session is that the server keeps state and, thus, allocates resources for each incoming connection attempt. In order to insulate a server from DOS attacks, a stateless protocol is disclosed for initial communication session establishment, so that if an invalid connection is attempted, the attempt is rebuffed without resource consumption. The stateless protocol may be implemented in a variety of ways, including using a front-end edge-server or middleman to handle connection attempts for the server, or by modifying a TCP/IP stack or other networking services on a server such as the network interface hardware or driver software.

Figure 3:
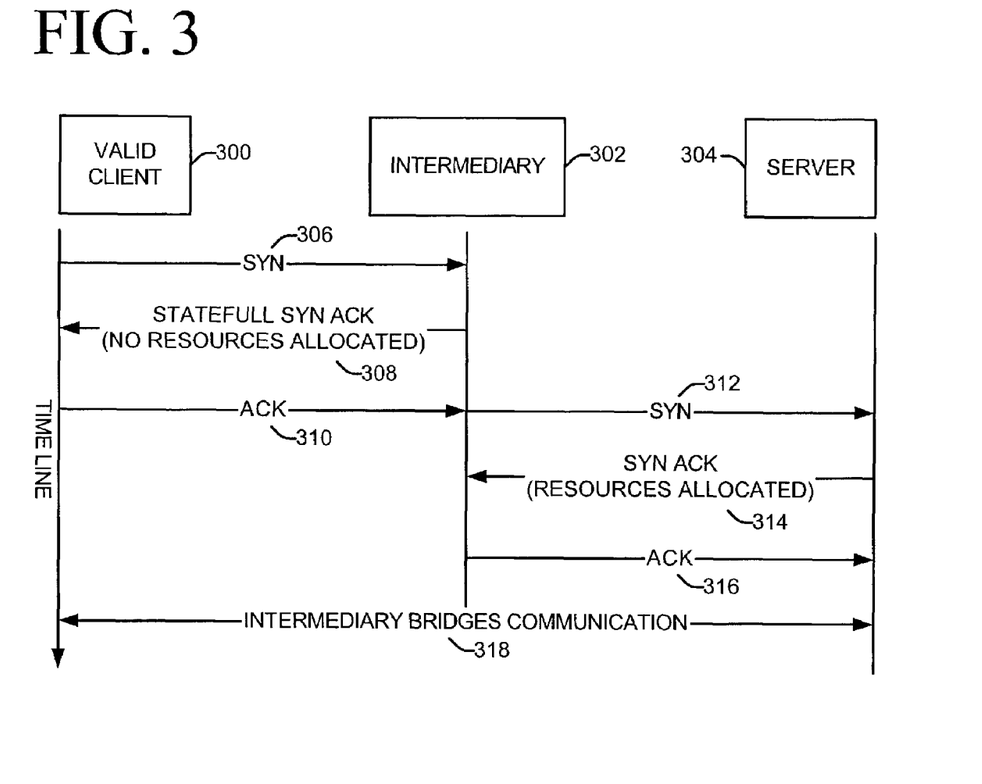
FIG. 3 illustrates, according to one embodiment, a communication timeline between a client and an intermediary utilizing a stateless protocol to manage connection attempts from the client to a server.

FIG. 3 illustrates, according to one embodiment, a communication timeline between a valid client 300 and an intermediary 302 utilizing a stateless protocol to manage connection attempts from between clients and a server 304. Generally, the illustrated embodiment operates according to the principle that a set of data A may be used to encrypt a set of data B, where A is known to the intermediary 302. If the intermediary sends encrypted B to the valid client, then the intermediary, knowing A, can decrypt a response from the valid client and recover B. This principle is applied to a TCP/IP session handshake between the intermediary and the valid client, where B is determined with respect to the TCP session being established, and is used to construct a SYN/ACK packet containing encrypted B. When a responsive packet incorporating encrypted B is received from the valid client, the intermediary, knowing A, can recover decrypted B to validate the response. By making it infeasible for an attacker to predict encrypted B, if B cannot be recovered from the response, then the response can be ignored without having recorded state.

The valid client 300 sends 306 the intermediary 302 a SYN packet. In response, rather than conventionally allocating resources for tracking the attempt to establish a communication session, the intermediary responds 308 with a special "statefull" SYN/ACK packet encoding the characteristics of the connection attempt. That is, rather than using resources to track connection data, relevant connection data (e.g., client source address and/or port, destination address and/or port, a secret for validating responsive ACKs, etc.) is encoded within the SYN/ACK packet. In one embodiment, the connection data is encoded within the ISN value of the server's ACK sent to the client.

Once the client sends 310 its ACK, the intermediary can decode the data within the client's acknowledgement number to recover the connection data encoded within the corresponding SYN/ACK message originally sent 308 by the intermediary to the client. The intermediary will use this recovered information to verify the message is a response to the SYN/ACK message sent 308. In one embodiment, the connection data includes a time component of when the intermediary sent 308 the SYN/ACK, and on receiving 310 the ACK, the intermediary verifies the response was received within a reasonable time period (e.g., the TCP timeout period). Given the decoded time corresponding to when the message was sent 308 is within a reasonable time period given the current time, e.g., when the ACK was received 310, the intermediary sends 312 the server a SYN packet to begin the three-way handshake for establishing a communication session with the server. Assuming the server is performing a conventional handshake, in response to the SYN packet, the server allocates resources and replies 314 with a SYN/ACK packet. In response the intermediary sends 316 an ACK packet to complete the handshake. At this point, the intermediary has an active communication session with the client, and with the server.

In one embodiment, the intermediary operates to bridge the two communication sessions. Packets received from the client are adjusted and forwarded to the server, and conversely, packets received from the server are adjusted and forwarded to the client. It will be appreciated that since the client-intermediary and intermediary-server communication sessions are likely to be using different sequencing (ISN) numbers, packet adjustment includes translating sequences accordingly. In another embodiment, the client and server are configured to receive instruction from the intermediary so that the client and server may communicate directly. In another embodiment, the client and server are configured to inspect their communication sessions with the intermediary and determine how to directly communicate without instruction from the intermediary.

Although only a single server is illustrated, it will be appreciated that the intermediary may be an edge device for an entire network of machines/servers. It will be further appreciated that in some embodiments (not illustrated), Domain Name Servers (DNS), other host resolution services, gateways, port mappers, or the like, may be configured so that attempts to locate or contact server 304 results in contacting the intermediary 302.

Figure 4:
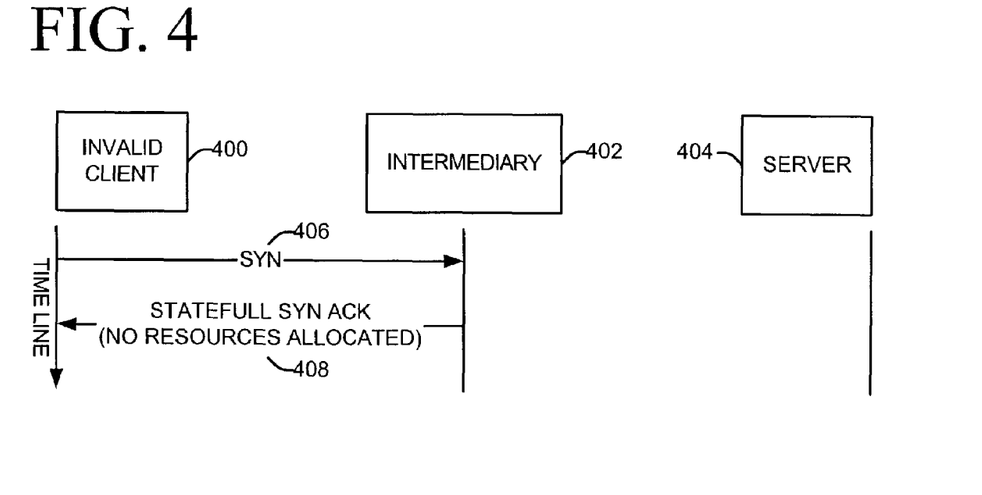
FIG. 4 illustrates an attempted SYN attack by a client on a server.

FIG. 4 illustrates an attempted SYN attack by an invalid client 400 on a server 404. As discussed above, an intermediary 402 receives connections attempts for the server. After the invalid client sends 406 a SYN packet, the intermediary responds 408 with SYN/ACK packet constructed according to a stateless protocol. Unless the invalid client sends an appropriate ACK packet, the intermediary does not establish a communication session with the server, and the server therefore never becomes aware of the connection attempt by the invalid client.

In addition to the illustrated SYN attack, another mode of attack is for an invalid client to send ACK packets to a server for non-existent connections. Such attacks normally cause the server to expend resources in attempting to locate the non-existent connections. With the illustrated embodiments of the invention, such an attack is inoperable as such blindly sent ACK packets will not be properly constructed and therefore can be discarded. That is, as discussed above for FIG. 3, when the intermediary sends 408 the SYN/ACK packet, the client is expected (as is typical for TCP/IP) to responds with an ACK comprising a sequence value determined by incrementing the intermediary's ISN value by one. Since the intermediary's SYN/ACK is constructed with respect to various connection data, as well as a secret value, an invalid client will not have enough information to spoof a valid ACK. Thus the invalid ACK may be discarded by the intermediary without the server becoming aware of the attack.

Figure 5:
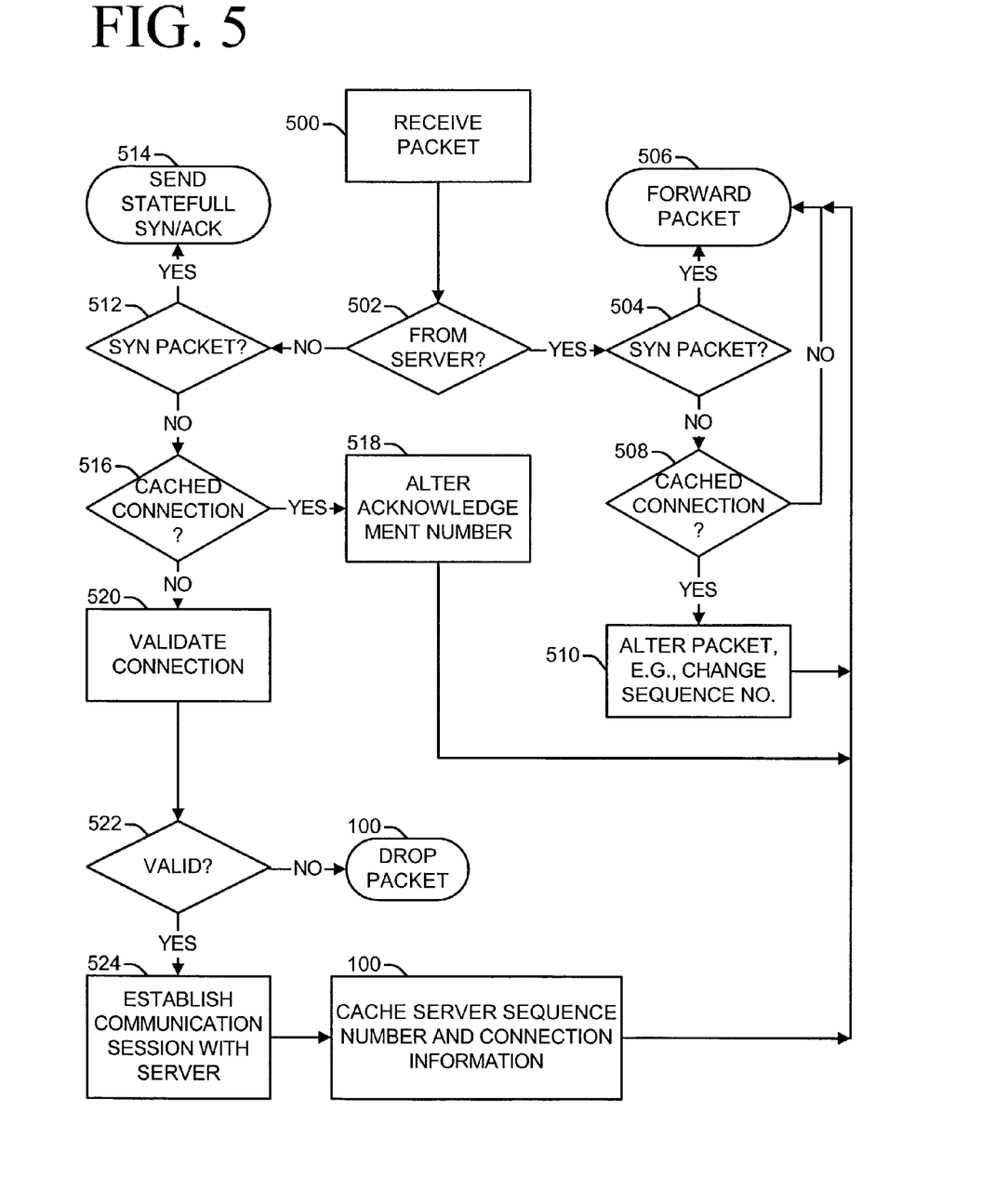
FIG. 5 illustrates processing of a received packet according to one embodiment of the invention.

FIG. 5 illustrates processing of a received packet according to one embodiment of the invention. A packet is received 500 by an intermediary. A test 502 is performed to determine whether the packet was received from a server being protected by the intermediary. If so, then a test 504 is performed to determine whether the packet is a SYN packet, indicating initiation by the server of a connection session. If so, then the packet is forwarded 506 since it originates from the server and the illustrated embodiments of the invention are not attempting to restrict server-initiated communication.

If 504 it is not a SYN packet, e.g., the ACK portion of the packet is set, then, a test 508 is performed to determine whether the packet corresponds to a known communication session. It is assumed that some sort of lookup table, e.g., hash based, or cache technique is used to track known communication sessions. In one embodiment, an intermediary maintains a hash table tracking information about each valid communication session, as well as the ISN generated by the server's TCP stack when the intermediary established a communication session with the server for a client that completed establishing a communication session with the intermediary. The contents of the hash table is used to track any alterations to sequencing, addressing, or other packet data that is required to enable the client and server to communicate. Thus, the received 500 packet is looked up in the hash table, and if 508 found, the sequence number (and other data if necessary) of the packet is altered 510 and the packet forwarded 506 for delivery to the client.

If 508 the packet is not in the cache, this packet corresponds to a connection initiated by the server and therefore does not require special handling by the intermediary, and the packet is forwarded 506.

If 502 the packet is not from the server, then a test is performed to determine if the packet is a SYN packet. If so, then the intermediary sends 514 a statefull SYN/ACK response to the packet. As discussed above with respect to FIG. 3, many different encoding techniques may be utilized to construct the SYN/ACK response packet encoding the characteristics of the connection attempt. In one embodiment, the ISN of the SYN/ACK packet is determined at least in part by the following computation:

(Current Time Stamp)XOR(Connection Data)XOR(Key)

where the Current Time Stamp may be determined by reading a clock tick, such as a processor clock, atomic clock, system clock, or other clock source having fine granularity, e.g., a millisecond; the Connection Data is based at least in part on the received packet's origin address, origin port, and server address and server destination port; and the Key is a secret that is maintained by the intermediary that changes frequently enough to keep ahead of potential cryptographic attacks on the key. In one embodiment, the Key is based on a true random number generator, where the Key changes every few seconds or so. The computation has the properties by which the current time stamp data can be reliably recovered given knowledge of the other elements of the function that are known by the intermediary (in this case the connection data and key). XOR has this property, but it can be substituted for other mechanisms that have this property.

As discussed above for FIG. 1, a valid client is expected to respond to the intermediary's SYN/ACK. Thus, if 502 a received 500 packet is not from the server, and if 512 it is not a SYN packet, then a test 516 is performed to whether the packet corresponds to a known established communication session, e.g., is the connection information present in the hash table tracking information about each valid communication session. If found, then the acknowledgement number (and other data if necessary) of the packet is altered 518 and the packet forwarded 506 for delivery to the server.

If 516 the packet is not in the cache, then the ACK portion of the packet is inspected to validate 520 that the packet corresponds to the SYN/ACK sent 514 by the intermediary. For the TCP/IP protocol, when responding to a SYN/ACK, the convention is for the ACK to have an ISN set to the ISN of the SYN/ACK incremented by one. Thus, in one embodiment utilizing the TCP/IP protocol, a packet ACK can be validated by determining, from the received 500 packet, the client source address, client source port, and server destination port; subtracting 1 from the ACK to potentially retrieve the sent 514 SYN/ACK ISN; and then XORing the SYN/ACK ISN against the client source address, client source port, and server destination port. The result will be potentially be a time stamp value XOR'd with a secret key (hereafter "the result").

Since keys are changing frequently, there may be several possible keys that were used to create the statefull SYN/ACK. For example, a first key may have been in use when the statefull SYN/ACK was computed, and a second or third key in use before a responsive ACK was received. However, a known quantity is the time out period in use for the establishment of the TCP/IP communication session.

Therefore, to identify the correct key, as well as to validate that the ACK is responsive to a statefull SYN/ACK, each potentially valid key, e.g., the first, second and third keys, are XOR'd against the result to see if the resultant data is a time stamp value within the time out period. If 522 so, the packet is an ACK response to a statefull SYN/ACK, the client is valid, and the intermediary can then establish 524 a communication session with the server. The intermediary then caches 526 the ISN (sequence number) in use by the client, and other connection data, so that packets between the client and server can be identified (e.g., items 508, 516) and forwarded (e.g., item 506) appropriately.

In an another embodiment, the ISN (sequence number) of the SYN/ACK packet sent 514 by the intermediary is determined at least in part by the following computation:

(Current Time Stamp)XOR Hash(Connection Data) [XOR (Key)]

where the Hash function is a one-way hash applied to the connection data. Use of the key, as discussed above is optional. In this embodiment, connection data is hashed so that an attacker is not able to analyze the ISN to predict the connection data portion, substitute fake connection data, and then send multiple attacking ACKs. By applying a one-way hash function, even if an attacker determines the connection data portion of the ISN, the attacker cannot guess a value corresponding to an application of the one-way hash to the attacker's invalid origin address, port, etc.

In an another embodiment, the ISN of the SYN/ACK packet sent 514 by the intermediary is determined at least in part by the following computation:

Scramble(Current Time Stamp)XOR Hash(Connection Data) [XOR (Key)]

where the connection data is hashed with a one-way hash function as discussed above, the key as discussed above is optional, and the current time stamp is scrambled so that the low-order bits of the time stamp are not the only bits changing frequently, as this is a trait which might aid an attacker in identifying bits relating to a timer or counter.

Various scrambling techniques may be employed, including a simple deterministic substitution algorithm, where (assuming 32 bit quantities), a $1^{st}$ and $20^{th}$ bit are swapped, a $2^{nd}$ and $10^{th}$ bit are swapped, etc. until all 32 bits are swapped. Or, characteristics of the connection data may be used to direct the scrambling, or to select a particular scrambling function, e.g., the last digit of an IP source address may be used as an index value for the particular function to employ.

So, given the connection data in an ACK message, and assuming a key was not used, the time stamp in the INS can be determined by subtracting 1 from the ACK, and then XORing against the result of one-way hashing the connection data of the ACK. If the time stamp was scrambled, the resultant time stamp could be unscrambled in accordance with the scrambling function utilized. Once the time stamp is known, an ACK can be deemed valid if received within a certain window of time, e.g., the TCP time out period.

It will be appreciated that different techniques may be employed to implement the invention. One approach is to utilize an intermediary for communications between a client and a server. Another is to modify networking software of a server, such as a Network Interface Card (NIC) driver, operating system software, or other networking components of a server.

Figure 6:
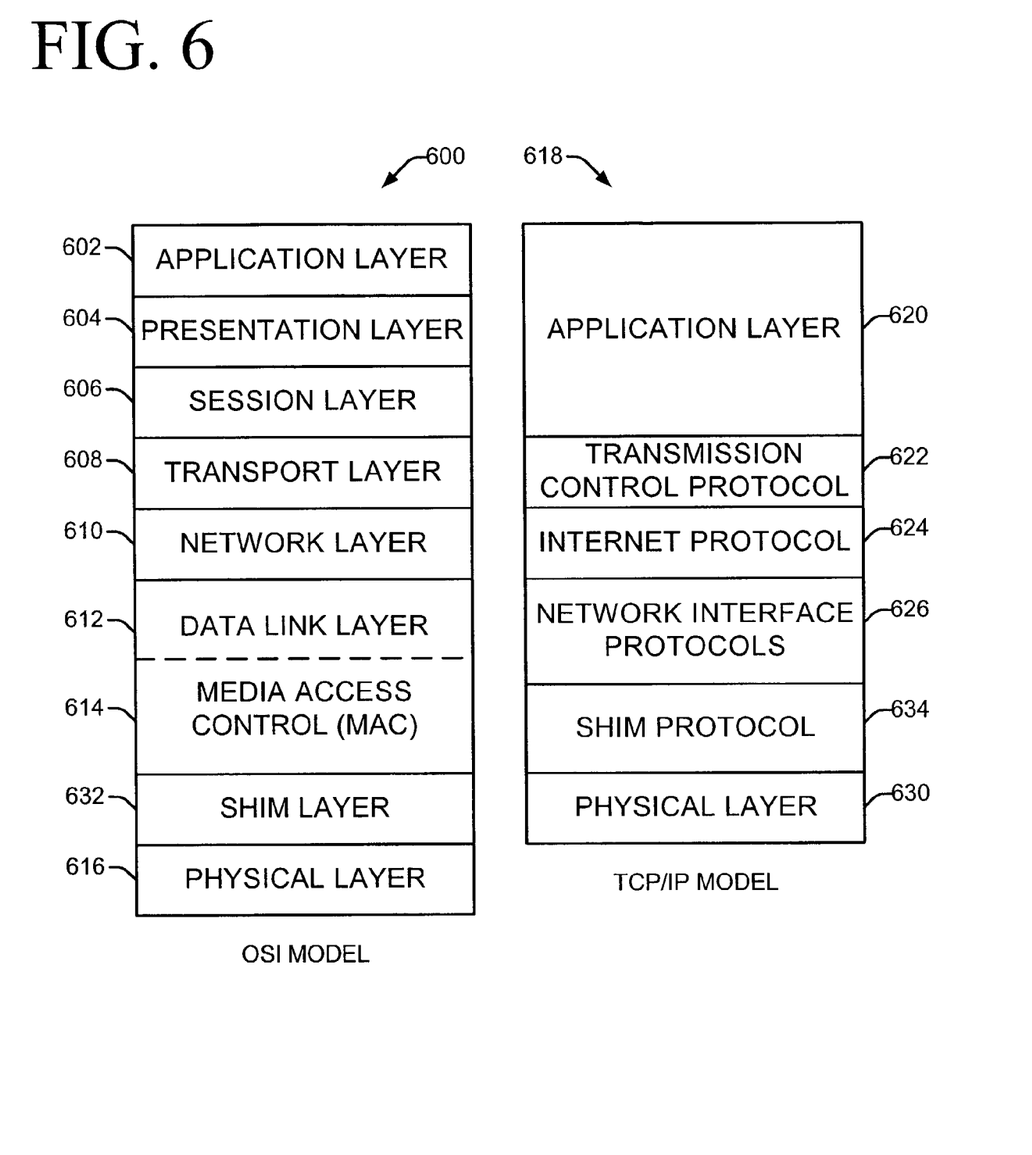
FIG. 6 illustrates, according to one embodiment, modifying a traditional TCP/IP networking model to implement techniques discussed for FIGS. 3 and 5.

FIG. 6 illustrates, according to one embodiment, modifying a traditional TCP/IP networking model 618 to implement the techniques discussed above with respect to FIGS. 3 and 5. The TCP/IP model is based on the well-known seven-layer Open Systems Interconnection (OSI) Reference Model 600 put forth by the International Standards Organization (ISO) in 1983.

The seven layers of the OSI model are the Physical 616, Data Link 612/Media Access Control 614, Network 610, Transport 608, Session 606, Presentation 604, and Application 602 layers. In the TCP/IP model 618, the Physical layer 630 corresponds to the OSI Physical layer 616. The Network Interface Protocols 626 layer corresponds to the OSI Data Link 612/MAC layer 614. The Internet protocol layer 624 corresponds to the OSI Network layer 610. The Transmission Control Protocol layer 622 corresponds to the OSI Transport layer 608. And, the Application layer 620 corresponds to the OSI Application 602, Presentation 604, and Session layers 606, as the Application layer may provide only some or all of the corresponding OSI layers.

The OSI and TCP/IP models (without the modifications 632, 634) are well understood by one skilled in the art. For further information on these models 600, 618, see *The*

*TCP/IP Companion: A Guide for the Common User*, by Martin Arick (Publisher: John Wiley & Sons; ISBN: 0471556319; (Sep. 24, 1993)), and *Computer Networks*, by Andrew S. Tanenbaum (Publisher: Prentice Hall PTR; ISBN: 0133499456; 3rd edition (Jan. 15, 1996)).

As understood in the art, to pass data between networked computing devices, data passes through each layer, and in passing each layer performs specific operations on the data, e.g., each layer processes or "encapsulates" the data according to the characteristics of the layer. Thus, in the TCP/IP model, for a networking application program executing on one computing device to send application data to another networking application program executing on another computing device, the application data is provided by the Application layer 620 to the lower levels 622–626, where the application data is ultimately broken up and packaged into packets that are delivered over the physical layer 628.

However, in the illustrated embodiment, and in contrast with the typical models, the illustrated models include Shim layers 632, 634. The Shim layers sit between two layers in a model, and provide networking services otherwise not available in the model for a networked computing device. As illustrated, the Shim layers are between the Network 610 and Data Link 612/MAC 614 layers in the OSI model, and the Internet Protocol 624 and Network Interface Protocols 626 layers in the TCP/IP model. The Shim layers are logically situated so that incoming data, once received by the physical layers 616, 628, and assembled into basic structure by the Data Link 612/MAC 614 and Network Interface Protocols 626, may be processed by the Shim layers prior to the incoming data being processed by higher layers.

Operationally, the Shim layers operate as an intermediary as described above with respect to FIGS. 3 and 5. It will be appreciated that although the Shim layers are illustrated as being between particular layers of the models 600, 618, the Shim layers may be implemented between different layers of the models depending on the functionality and transparency desired.

Figure 7:
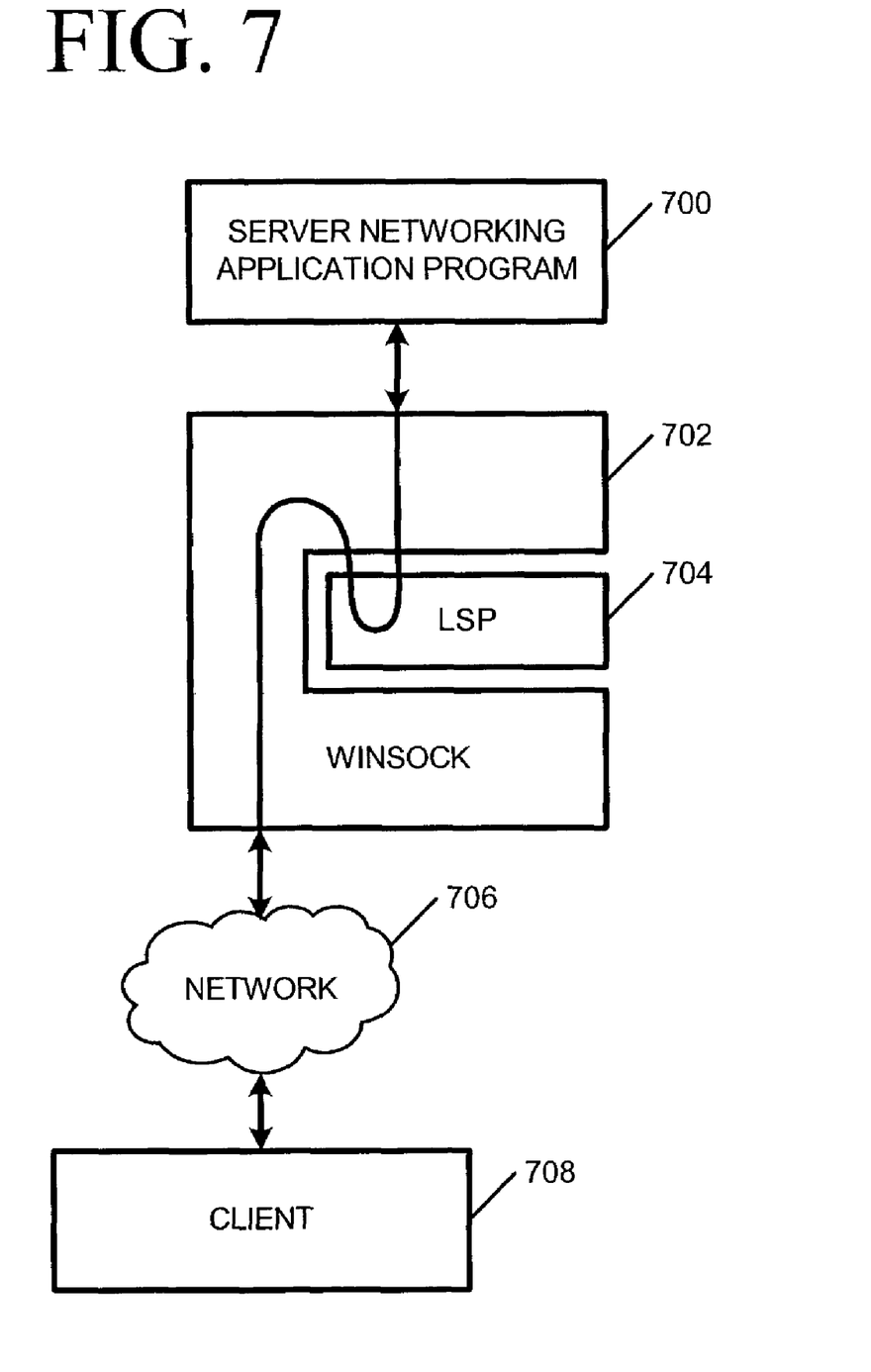
FIG. 7 illustrates one technique for incorporating an intermediary into a computing device networking services.

FIG. 7 illustrates one technique for incorporating an intermediary into a computing device's, e.g., a server's, networking services.

In the illustrated embodiment, it is assumed the server executes a networking application program 700 configured to receive incoming connections from external clients 708. However, unlike a conventional configuration where a server is susceptible to denial of service type attacks, as illustrated, a Layered Service Provider (LSP) 704 or equivalent construct is utilized in conjunction with the Microsoft Winsock networking services 702 to operate as an intermediary that insulates the server from attack. It will be appreciated that while the illustrated embodiment is directed towards Microsoft Corporation networking services, other networking implementations and operating systems are contemplated.

In one embodiment, the Winsock networking interface is extended with the LSP, which configures Winsock to pass on network access attempts to the LSP 704 for primary processing. For more information on LSPs, please see "Unraveling the Mysteries of Writing a Winsock 2 Layered Service Provider" by Hua et al., Microsoft Systems Journal (May 1999); Internet uniform resource locator (URL): msdn*Microsoft*com/library/default*asp?url=/library/en-us/dnmsj99/html/layeredService*asp (to prevent inadvertent hyperlinks, URL periods have been replaced with asterisks).

In the illustrated embodiment, a server networking application program 700 is executed on a server or other computing device, where the networking application program utilizes a certain protocol, such as the Transmission Control Protocol (TCP), to communicate or receive connections from other computing devices, e.g., a client 708, over a network 706. In order for the networking application program to receive connections from clients, the Winsock networking services 702 must ordinarily negotiate a TCP communication session with a client. To insulate the server from attacks, when the client attempts to establish communication with the server, the attempt is received by the LSP 704 which attempts to establish a connection with the client in a stateless manner as discussed above, e.g., without allocating resources.

If the client completes the connection establishment, then the LSP establishes a connection with the server by way of the Winsock, e.g., the Winsock sees the LSP as an incoming client connection, and the server allocates resources to communicate with the LSP. The LSP then bridges (e.g., akin to operation of a Network Address Translation (NAT) device) communication between the client and the server. Since the LSP is integrated in the server's networking services, the server is insulated from denial of service attacks since communication negotiation by way of the LSP consumes no resources until the client completes communication session establishment with the LSP. Such insulation is transparent to the networking application program 700. In one embodiment, the stateless communication negotiation with a client is configured as part of Winsock 702 and the LSP is now not required.

Figure 8:
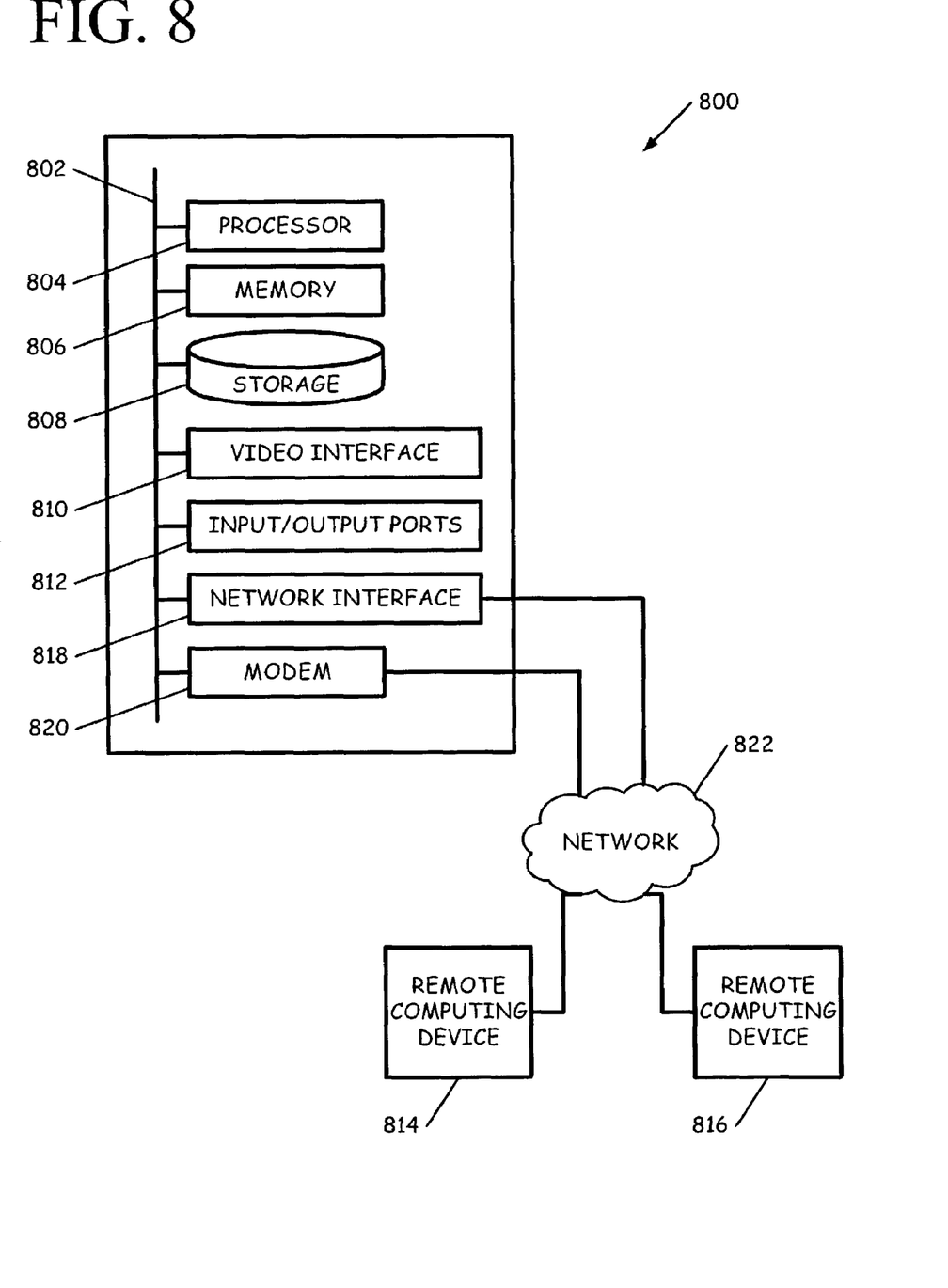
FIG. 8 illustrates a suitable computing environment in which certain aspects of the invention may be implemented.

FIG. 8 and the following discussion are intended to provide a brief, general description of a suitable computing environment in which certain aspects of the illustrated invention may be implemented. For example, the illustrated environment includes a machine 800 which may embody the intermediary 302 or server 304 of FIG. 3. As used herein, the term "machine" includes a single machine, such as a computer, handheld device, etc., or a system of communicatively coupled machines or devices.

Typically, the machine 800 includes a system bus 802 to which may be attached processors 804, a memory 806 (e.g., random access memory (RAM), read-only memory (ROM), or other state preserving medium), storage devices 808, a video interface 810, and input/output interface ports 812. It will be appreciated that some machines may be designed without some of these attachments 804–812. For example, an intermediary network device configurable over a network might not include the video interface or input/output interface ports. The machine may be controlled, at least in part, by input from conventional input devices, such as keyboards, mice, joysticks, as well as directives received from another machine, interaction with a virtual reality (VR) environment, biometric feedback, or other input source or signal.

The machine may also include embedded controllers, such as Generic or Programmable Logic Devices or Arrays, Application Specific Integrated Circuits, single-chip computers, smart cards, or the like, and the machine is expected to operate in a networked environment using physical and/or logical connections to one or more remote machines 814, 816 through a network interface 818, modem 820, or other data pathway. Machines may be interconnected by way of a wired or wireless network 822, such as an intranet, the Internet, local area networks, and wide area networks. It will be appreciated that network 822 may utilize various short range or long range wired or wireless carriers, including cellular, cable, laser, satellite, Bluetooth, and infrared.

The invention may be described by reference to or in conjunction with program modules, including functions, procedures, data structures, application programs, etc. for performing tasks, or defining abstract data types or low-level hardware contexts. Program modules may be stored in memory 806 and/or storage devices 808 and associated storage media, e.g., hard-drives, floppy-disks, optical storage, magnetic cassettes, tapes, flash memory cards, memory sticks, digital video disks, biological storage. Program modules may be delivered over transmission environments, including network 822, in the form of packets, serial data, parallel data, propagated signals, etc. Program modules may be used in a compressed or encrypted format, and may be used in a distributed environment and stored in local and/or remote memory, for access by single and multi-processor machines, portable computers, handheld devices, e.g., Personal Digital Assistants (PDAs), cellular telephones, etc.

Thus, for example, with respect to the illustrated embodiments, assuming machine 800 embodies the intermediary of FIG. 3, then remote machines 814, 816 may respectively be the valid client 300, and server 304 with which the client seeks to establish a communication session. It will be appreciated that remote machines 814, 816 may be configured like machine 800, and therefore include many or all of the elements discussed for machine.

Having described and illustrated the principles of the invention with reference to illustrated embodiments, it will be recognized that the illustrated embodiments can be modified in arrangement and detail without departing from such principles. And, though the foregoing discussion has focused on particular embodiments, other configurations are contemplated. In particular, even though expressions such as "in one embodiment," "in another embodiment," or the like are used herein, these phrases are meant to generally reference embodiment possibilities, and are not intended to limit the invention to particular embodiment configurations. As used herein, these terms may reference the same or different embodiments that are combinable into other embodiments.

Consequently, in view of the wide variety of permutations to the embodiments described herein, this detailed description is intended to be illustrative only, and should not be taken as limiting the scope of the invention. What is claimed as the invention, therefore, is all such modifications as may come within the scope and spirit of the following claims and equivalents thereto.

What is claimed is:

1. A method, wherein a first acknowledgement was determined based at least in part on a first hash value from applying a hash function to a source of a communication initiation request and a first time stamp, the method comprising:
   receiving a second acknowledgement responsive to the first acknowledgement;
   identifying a second source corresponding to the second acknowledgment;
   determining a second hash value by applying the hash function to the second source;
   extracting the second hash value from the second acknowledgement;
   extracting the first time stamp from the second acknowledgement;
   comparing the first and second hash values; and
   establishing a communication session based at least in part on the comparing.

2. The method of claim 1, wherein establishing the communication session further comprises:
   extracting a second time stamp from the second acknowledgement; and
   determining a difference between the first and second time stamps is within a time out period.

3. The method of claim 2, wherein the time out period is a TCP connection establishment time out.

4. The method of claim 1, wherein said extracting comprises XORing values against the second acknowledgement.

5. A method, wherein a first acknowledgement was determined based at least in part on a first hash value from applying a hash function to a source of a communication initiation request and a first time stamp, the method comprising:
   receiving a second acknowledgement responsive to the first acknowledgement;
   identifying a second source corresponding to the second acknowledgment;
   determining a second hash value by applying the hash function to the second source;
   extracting the first time stamp from the second acknowledgement; and
   establishing a communication session based at least in part on comparing the first and second hash values.

6. The method of claim 5, wherein selected ones of said acknowledgements comprise a sequence number, the sequence number determined at least in part on XORing an identifying characteristic of the initiation request and a selected one of the time stamp or a scrambled time stamp.

7. The method of claim 5, further comprising establishing the communication session after receiving the second acknowledgement.

8. The method of claim 5, wherein the first acknowledgement is configured with a first sequence number based at least in part on an identifying characteristic of the initiation request and the time stamp, the method further comprising:
   validating that the second acknowledgement comprises an acknowledgement number determined by incrementing the first sequence number.

9. The method of claim 5, further comprising:
   establishing a second communication session with a server; and
   bridging the communication session and the second communication session.

10. The method of claim 9, further comprising:
    the communication session having a first sequence of packets having first sequence numbers;
    the second communication session having a second sequence of packets having second sequence numbers; and
    said bridging comprising translating packets from the source to correspond to the second sequence numbers, and forwarding translated packets to the server.

11. The method of claim 5, further comprising:
    establishing the communication session with a source, the communication session comprising packets associated with a first sequence;
    establishing a second communication session with a server, the second communication session comprising packets associated with a second sequence; and
    associating packets received from the source with the second sequence.

12. The method of claim 11, wherein associating packets received from the source with the second sequence comprises:
    translating a first sequence identifier of a packet received from the source into a second sequence identifier corresponding to the second sequence.

13. The method of claim 5, further comprising:
establishing the communication session with a source, the communication session comprising packets associated with a first sequence;
establishing a second communication session with a server, the second communication session comprising packets associated with a second sequence; and
associating packets received from the server with the first sequence.

14. The method of claim 13, wherein associating packets received from the server with the first sequence comprises:
translating a first sequence identifier of a packet received from the server into a second sequence identifier corresponding to the first sequence.

15. The method of claim 5, wherein establishing the communication session further comprises:
extracting a second time stamp from the second acknowledgement; and
determining a difference between the first and second time stamps is within a time out period.

16. An article, comprising a processing device accessible media storing data for operating one or more processing devices, wherein a first acknowledgement is determined based at least in part on a first hash value from applying a hash function to a source of a communication initiation request and a first time stamp, and wherein the data, when accessed, results in the one or more processing devices performing:
receiving a second acknowledgement responsive to the first acknowledgement;
identifying a second source corresponding to the second acknowledgment;
determining a second hash value by applying the hash function to at least the second source;
extracting the first time stamp from the second acknowledgement; and
establishing a communication session based at least in part on comparing the first and second hash values.

17. The article of claim 16, wherein the data for establishing the communication session further includes data, when accessed by the one or more processing devices, results in the one or more processing devices performing:
extracting a second time stamp from the second acknowledgement; and
determining a difference between the first and second time stamps is within a time out period.

18. The article of claim 16, wherein the time out period is a TCP connection establishment time out.

19. The article of claim 16, wherein the data for said extracting further includes data, when accessed by the machine, results in the one or more processing devices performing at least XORing values against the second acknowledgement.

20. The article of claim 16, wherein selected ones of said acknowledgements comprise a sequence number, the sequence number determined at least in part on XORing an identifying characteristic of the initiation request and a selected one of the time stamp or a scrambled time stamp.

21. The article of claim 16, wherein the data further includes data, when accessed by the one or more processing devices, results in the machine performing:
establishing the communication session after receiving the second acknowledgement.

22. The method of claim 16, wherein the first acknowledgement is configured with a first sequence number based at least in part on an identifying characteristic of the initiation request and the time stamp, and wherein the data further includes data, when accessed by the one or more processing devices, results in the one or more processing devices performing:
validating that the second acknowledgement comprises an acknowledgement number determined by incrementing the first sequence number.

23. The article of claim 16, wherein the data further includes data, when accessed by the one or more processing devices, results in the one or more processing devices performing:
establishing a second communication session with a server; and
bridging the communication session and the second communication session.

24. The article of claim 23, wherein the data further includes data, when accessed by the one or more processing devices, results in the one or more processing devices performing:
the communication session having a first sequence of packets having first sequence numbers;
the second communication session having a second sequence of packets having second sequence numbers; and
said bridging comprising translating packets from the source to correspond to the second sequence numbers, and forwarding translated packets to the server.

25. The article of claim 16, wherein the data further includes data, when accessed by the one or more processing devices, results in the one or more processing devices performing:
establishing the communication session with a source, the communication session comprising packets associated with a first sequence;
establishing a second communication session with a server, the second communication session comprising packets associated with a second sequence; and
associating packets received from the source with the second sequence.

26. The article of claim 25, wherein the data for associating packets received from the source with the second sequence further includes data, when accessed by the one or more processing devices, results in the one or more processing devices performing:
translating a first sequence identifier of a packet received from the source into a second sequence identifier corresponding to the second sequence.

27. The article of claim 16, wherein the data further includes data, when accessed by the one or more processing devices, results in the one or more processing devices performing:
establishing the communication session with a source, the communication session comprising packets associated with a first sequence;
establishing a second communication session with a server, the second communication session comprising packets associated with a second sequence; and
associating packets received from the server with the first sequence.

28. The article of claim 27, wherein the data for associating packets received from the server with the first sequence wherein the data for associating packets received from the source with the second sequence further includes data, when accessed by the one or more processing devices, results in the one or more processing devices performing:
translating a first sequence identifier of a packet received from the server into a second sequence identifier corresponding to the first sequence.

29. A system of cooperatively executing circuitry, comprising:
- a first circuitry configured to perform accessing a first acknowledgement based at least in part on a first hash value determined based at least in part on applying a hash function to a communication initiation request and a first time stamp;
- a second circuitry configured to perform accessing a second acknowledgement responsive to the first acknowledgement, identifying a second source corresponding to the second acknowledgment, determining a second hash value by applying the hash function to the second source, extracting the first time stamp from the second acknowledgement; and
- a third circuitry configured to perform establishing a communication session based at least in part on comparing the first and second hash values.

30. The system of claim 29, wherein said circuitry configured to perform establishing the communication session further comprises circuitry to perform:
- extracting a second time stamp from the second acknowledgement; and
- determining a difference between the first and second time stamps is within a time out period.

* * * * *